US008775493B2

(12) United States Patent
Vontela et al.

(10) Patent No.: US 8,775,493 B2
(45) Date of Patent: Jul. 8, 2014

(54) DOUBLE-STEP CORDIC PROCESSING FOR CONVENTIONAL SIGNED ARITHMETIC WITH DECISION POSTPONING

(75) Inventors: Siva Swaroop Vontela, Andhra Pradesh (IN); Vidya Prabhu, Karnataka (IN); Priyabrata Kundu, Karnataka (IN)

(73) Assignee: LSI Corporation, San Jose, CA (US)

( * ) Notice: Subject to any disclaimer, the term of this patent is extended or adjusted under 35 U.S.C. 154(b) by 563 days.

(21) Appl. No.: 13/085,616

(22) Filed: Apr. 13, 2011

(65) Prior Publication Data

US 2012/0265796 A1    Oct. 18, 2012

(51) Int. Cl.
*G06F 7/38*    (2006.01)
(52) U.S. Cl.
USPC ......................................................... 708/441
(58) Field of Classification Search
USPC .................................. 708/274–276, 440–442
See application file for complete search history.

(56) References Cited

U.S. PATENT DOCUMENTS

| 4,646,173 | A | 2/1987 | Kammeyer et al. |
| 6,385,632 | B1 * | 5/2002 | Choe et al. ..................... 708/270 |
| 6,480,871 | B1 * | 11/2002 | Phatak .......................... 708/440 |
| 7,606,852 | B2 * | 10/2009 | Maharatna et al. ............ 708/441 |
| 2006/0200510 | A1 | 9/2006 | Wang et al. |
| 2007/0233768 | A1 * | 10/2007 | Fritsch et al. ................. 708/490 |
| 2007/0237252 | A1 * | 10/2007 | Li ................................ 375/264 |
| 2008/0144740 | A1 * | 6/2008 | Alderson ...................... 375/316 |
| 2010/0131577 | A1 * | 5/2010 | Gangalakurti et al. ....... 708/209 |
| 2010/0138632 | A1 * | 6/2010 | Gangalakurti et al. ........... 712/7 |

OTHER PUBLICATIONS

Singh, Phatak, Goff, Riggs, Plusquellic, and Patel, "Comparison of branching CORDIC implementations," IEEE International Conference on Application-Specific Systems, Architectures, and Processors, pp. 215-225, Jun. 2003.*
W. Han, Z. Yousi, and L. Xiaokang, "A Parallel Double-Step CORDIC Algorithm for Digital Down Converter," in Communication Networks and Services Research Conference, 2009.*
S. Wang, V. Piuri, and E. Swartzlander, "A unified view of CORDIC processor design," in IEEE 39th Midwest Symp. Circuits Syst., pp. 852-855, 1996.*
J.-H.Kwak, V. Piuri, and E.E. Swartzlander, Jr. "Fault-Tolerant High-performance CORDIC Processors," IEEE Proc. of the International Symposium on Defect and Fault Tolerance in VLSI Systems. 2000.*
J -H Choi, J.-H.Kwak, and E.E. Swartzlander, Jr., "High-Speed CORDIC Architecture Based on Redundant Sum Formation and Overlapped Sigma-Selection," IEEE Proc. of the International Conference on the Computer Design, 1999.*
S. Wang, Z. Wen, and L. Yu. "High-performance fault-tolerant CORDIC processor for space applications," In Proceedings of the 1st International Symposium on Systems and Control in Aerospace and Astronautics, Jan. 2006.*

(Continued)

*Primary Examiner* — Chuong D Ngo
*Assistant Examiner* — Matthew Sandifer
(74) *Attorney, Agent, or Firm* — Mendelsohn, Drucker & Dunleavy, P.C.; Steve Mendelsohn (57) ABSTRACT

A double-step CORDIC algorithm is implemented for conventional signed arithmetic using multiple iteration stages in which at least one stage implements decision postponing, in which the decision for each stage is delayed until the next stage. In one implementation, the decision for the previous stage is implemented in parallel with the execution of CORDIC equation functions for the current stage. Implementing the double-step CORDIC with decision postponing algorithm can increase the speed of the CORDIC function compared to prior-art CORDIC implementations.

12 Claims, 5 Drawing Sheets

(56) References Cited

OTHER PUBLICATIONS

"The CORDIC Algorithm: New Results for Fast VLSI Implementation," by Jean Duprat et al., IEEE Transactions on Computers, vol. 42, No. 2, Feb. 1993, pp. 168-178.

"Comparison of Branching CORDIC Implementations," by Abhishek Singh et al., Application-Specific Systems, Architectures, and Processors, 2003, Proceedings, IEEE International Conference, Jun. 2003, 15 pages.

"The CORDIC Trigonometric Computing Technique," by Jack E. Volder, The Institute of Radio Engineers, Inc. (now the Institute of Electrical and Electronic Engineers, Inc.), Sep. 1959, pp. 226-230.

"Double Step Branching CORDIC: A New Algorithm for Fast Sine and Cosine Generation," by Dhananjay S. Phatak, IEEE Transactions on Computers, vol. 47, No. 5, May 1998, pp. 587-602.

"Comments on Duprat and Muller's Branching CORDIC Paper 1," by Dhananjay S. Phatak, IEEE Transactions on Computers, vol. 47, No. 9, Sep. 1998, pp. 1037-1040.

* cited by examiner

DOUBLE-STEP CORDIC PROCESSING FOR CONVENTIONAL SIGNED ARITHMETIC WITH DECISION POSTPONING

BACKGROUND

1. Field of the Invention

The present invention relates to processor-based implementations of mathematical functions and, more specifically but not exclusively, to coordinate rotation digital computer (CORDIC) processing.

2. Description of the Related Art

This section introduces aspects that may help facilitate a better understanding of the invention. Accordingly, the statements of this section are to be read in this light and are not to be understood as admissions about what is prior art or what is not prior art.

The CORDIC algorithm, also referred to as the digit-by-digit method or Volder's algorithm, is a hardware-efficient iterative bound convergence method for solving trigonometric and other mathematical functions. Using the CORDIC algorithm, elementary functions can be realized just by table look-up, shift, and add operations, which make the CORDIC algorithm very attractive for hardware implementations.

Assuming a vector $(X_i, Y_i)$ rotates by an angle $\alpha_i$ and arrives at $(X_{i+1}, Y_{i+1})$ in the Cartesian plane, the angular rotation can be described by Equations (1) and (2) as follows:

$$X_{i+1} = X_i \cos \alpha_i - Y_i \sin \alpha_i = \cos \alpha_i (X_i - Y_i \tan \alpha_i) \quad (1)$$

$$Y_{i+1} = Y_i \cos \alpha_i + X_i \sin \alpha_i = \cos \alpha_i (Y_i + X_i \tan \alpha_i) \quad (2)$$

If the rotation angle is restricted such that $\tan \alpha_i = \pm 2^{-i}$, then the multiplication by the tangent can be reduced to a simple shift operation.

Figure 1:
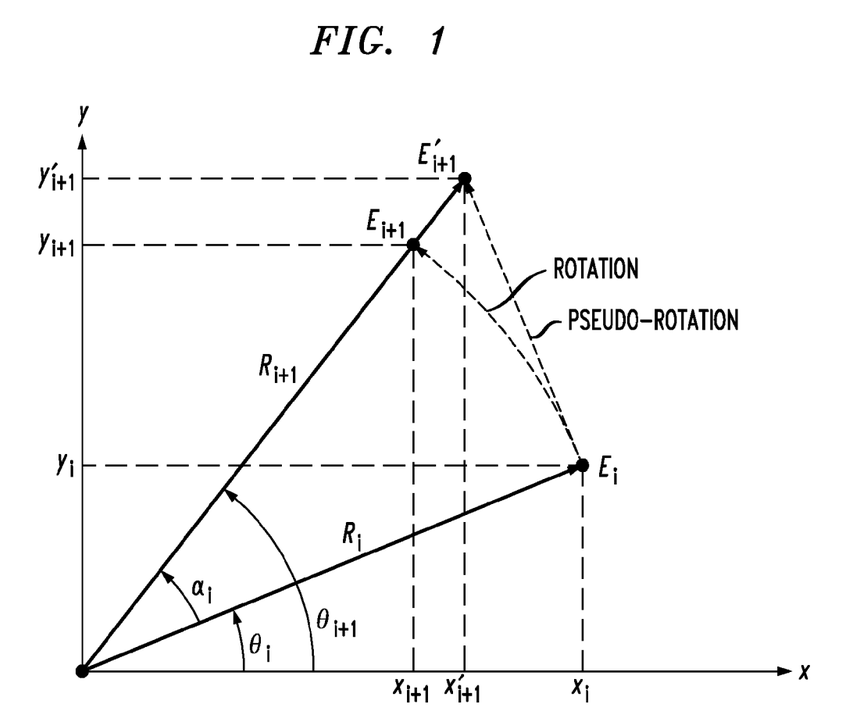
FIG. 1 graphically shows the concept of pseudo-rotation.

FIG. 1 graphically shows how a pseudo-rotation produces a vector with the same angle as the rotated vector, but with a length given by Equation (3) as follows:

$$R_{i+1} = R_i / \cos \alpha_i \quad (3)$$

With the above analysis, the classical CORDIC functions in each iteration i of circular rotation mode assuming pseudo-rotation are given by Equations (4)-(6) as follows, where Z stands for $\theta$:

$$X_{i+1} = X_i - d_i Y_i 2^{-i} \quad (4)$$

$$Y_{i+1} = Y_i + d_i X_i 2^{-i} \quad (5)$$

$$Z_{i+1} = Z_i - d_i \arctan(2^{-i}), d_i = \text{sign}(Z_i) \in \{-1, 1\} \quad (6)$$

Considering a series of n pseudo-rotations, the vector magnitude increases by a factor of $1/K$, where $K = \pi \cos(\arctan(2^{-i}))$. The coordinates $(X_n, Y_n)$ after this series of n pseudo-rotations are given by:

$$X_n = 1/K(X_0 \cos \theta - Y_0 \sin \theta) \quad (7)$$

$$Y_n = 1/K(Y_0 \cos \theta + X_0 \sin \theta) \quad (8)$$

If the initial values of $X_0$ and $Y_0$ are chosen to be K and 0, respectively, and $Z_0$ is initialized to angle $\theta$, then, after a predetermined set of pseudo-rotations determined by $\arctan(2^{-i})$, $X_n$ and $Y_n$ converge to cosine and sine components of the angle $\theta$ as Z converges to zero.

In general, to achieve n bits of precision, n pre-computed rotation angles ($\arctan(2^{-i})$) are stored in a look-up table (LUT) and n CORDIC iterations perform Equations (4)-(6). High accuracy demands a large number of iterations to be performed, and the main challenge is to reduce the number of iterations and thus speed up the computation process.

The double-step CORDIC method combines two classical CORDIC angle rotations (iterations) into a single step. It was originally proposed for redundant binary signed digit (BSD) arithmetic as an enhancement over the branching CORDIC method.

SUMMARY

In one embodiment, the present invention is a double-step CORDIC processor comprising a plurality of iteration stages connected in series. At least one iteration stage generates a set of outgoing signals from a set of incoming signals. The at least one iteration stage comprises one or more equation blocks, a selector, and a decision block. The one or more equation blocks implement CORDIC equation functions based on the set of incoming signals generated by a previous iteration stage to generate at least a first subset of intermediate signals and a second subset of intermediate signals. The selector selects one of the at least first and second subsets of intermediate signals to be the set of outgoing signals based on a control signal. The decision block generates the control signal for the selector, wherein the decision block operates in parallel with the one or more equation blocks.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Classical CORDIC Implementation

Figure 2:
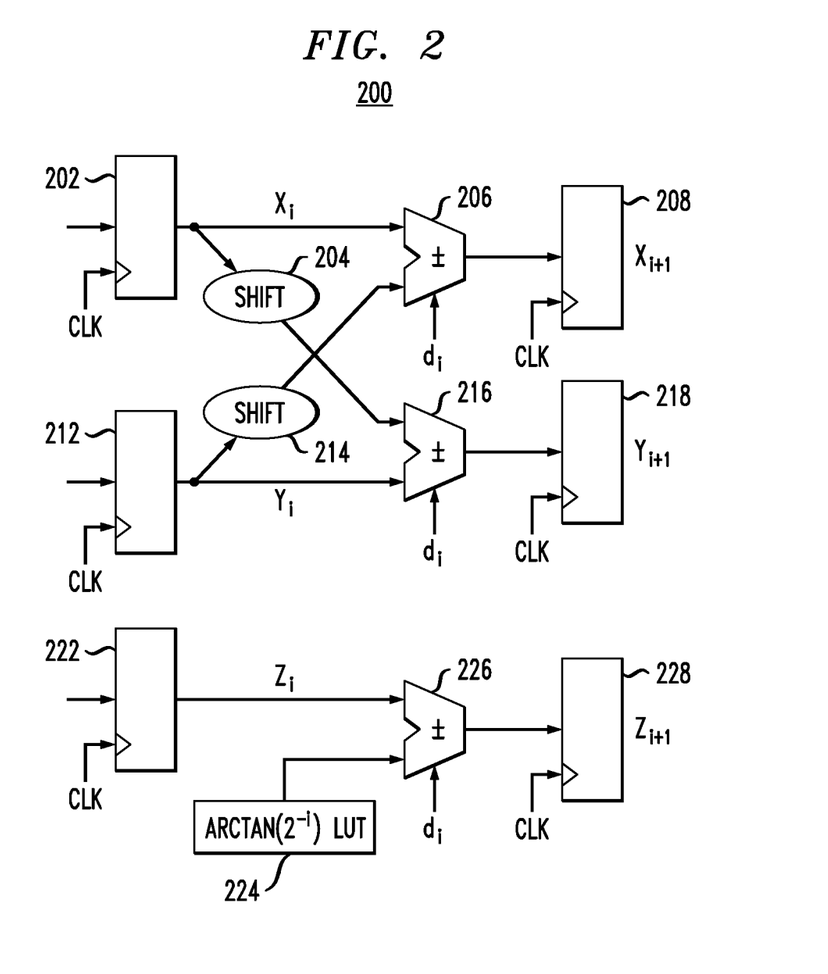
FIG. 2 shows a schematic block diagram of the $i^{th}$ pipeline stage of one possible implementation of the classical CORDIC algorithm.

FIG. 2 shows a schematic block diagram of the $i^{th}$ pipeline stage 200 of one possible implementation of the classical CORDIC algorithm. As described earlier, to achieve n bits of precision in the resulting cosine and sine values, n CORDIC iterations are required, where each iteration is implemented by a corresponding instance of stage 200 of FIG. 2. In one implementation, to achieve accuracy of 4 decimal places, a word length of 20 bits is chosen which requires 20 CORDIC iterations. A 20-stage pipelined data path is implemented for this purpose, where each pipeline stage 200 performs one iteration.

As represented in FIG. 2, adders 206, 216, and 226 implement Equations (4), (5), and (6), respectively, where shift operators 204 and 214 apply an i-bit right shift to the values of signals $X_i$ and $Y_i$, respectively, and look-up table (LUT) 224 provides the value $\arctan(2^{-i})$ to adder 226. Note that adders 206, 216, and 226 either add or subtract their inputs based on the value of signal $d_i$. In particular, when signal $d_i$ is +1, adders 206 and 226 subtract their lower input from their upper input, while adder 216 adds its lower input to its upper input, and vice versa when signal $d_i$ is −1. Input (e.g., flip-flop) registers 202, 212, and 222 provide input signal values $X_i$, $Y_i$, and $Z_i$, respectively, from the previous (i.e., $(i-1)^{th}$) stage at each cycle of clock clk, while output (e.g., flip-flop) registers 208, 218, and 228 provide output signal values $X_{i+1}$, $Y_{i+1}$, and $Z_{i+1}$, respectively, to the next (i.e., $(i+1)^{th}$) stage at each cycle of clock clk.

The speed of the overall circuit (comprising n instances of stage 200) is limited by the delay of the adders (usually in the X or Y signal path), which depends on the carry-propagation network. With the use of fast addition schemes like carry look ahead or carry select addition, the delay of the overall circuit will be a logarithmic function of the word length.

Conventional Double-Step CORDIC Algorithm and Implementation

As stated earlier, the double-step CORDIC algorithm was originally proposed for redundant binary signed digit (BSD) arithmetic as an enhancement over the branching CORDIC method. Since the control logic of the above implementation is extremely complex and results in large area penalty, the present invention explores the basic idea of the double-step CORDIC algorithm using conventional 2's complement arithmetic.

In a conventional implementation (using 2's complement notation) of the double-step CORDIC algorithm, two iterations of the classical CORDIC algorithm of FIG. 2 are performed in a single step. For simplicity, only the Z signal path is discussed here; the same can be extended to X and Y signal paths. In the conventional implementation, assuming two iterations in a single step, the CORDIC equation for signal Z is shown in Equation (9) as follows:

$$Z_{i+2} = Z_i - d_i \arctan(2^{-i}) - d_{i+1} \arctan(2^{-(i+1)}), \text{ where } d_i = \text{sign}(Z_i), d_{i+1} = \text{sign}(Z_{i+1}) \quad (9)$$

Since signal $d_{i+1}$ is required in advance to evaluate Equation (9) in a single step, two computations ("α" and "β") are performed in parallel for the two possible values of signal $d_{i+1}$ (i.e., for "α", $d_{i+1} = d_i$ and, for "β", $d_{i+1} = -d_i$) as shown in Equations (10) and (11) as follows:

$$Z_{k+1}^{\alpha} = Z_k - d_k \arctan(2^{-2k}) - d_k \arctan(2^{-(2k+1)}) \quad (10)$$

$$Z_{k+1}^{\beta} = Z_k - d_k \arctan(2^{-2k}) + d_k \arctan(2^{-(2k+1)}) \quad (11)$$

Note that each step k in this double-step method is equivalent to two classical iterations.

Once signals $Z_{k+1}^{\alpha}$ and $Z_{k+1}^{\beta}$ are generated, the decision block shown in the following pseudocode is used to determine the correct path.

```
Conventional_Double_Step_CORDIC( ) {
    CORDIC_Equations_C( ) {
        d_k = sign(Z_k)
        Z_{k+1}^α = Z_k − d_k arctan(2^−2k) − d_k arctan(2^−(2k+1))
        Z_{k+1}^β = Z_k − d_k arctan(2^−2k) + d_k arctan(2^−(2k+1))
    }
    Decision_Block_C( ) {
        if ( sign(Z_{k+1}^α) == sign(Z_k) ) "α" is correct
        else if ( sign(Z_{k+1}^β) == − sign(Z_k) ) "β" is correct
        else if ( mag(Z_{k+1}^α) < mag(Z_{k+1}^β) ) "α" is correct
        else "β" is correct
    }
    Selector_C( ) {
        if ("α" is correct) Z_{k+1} = Z_{k+1}^α
        if ("β" is correct) Z_{k+1} = Z_{k+1}^β
    }
}
```

Figure 3:
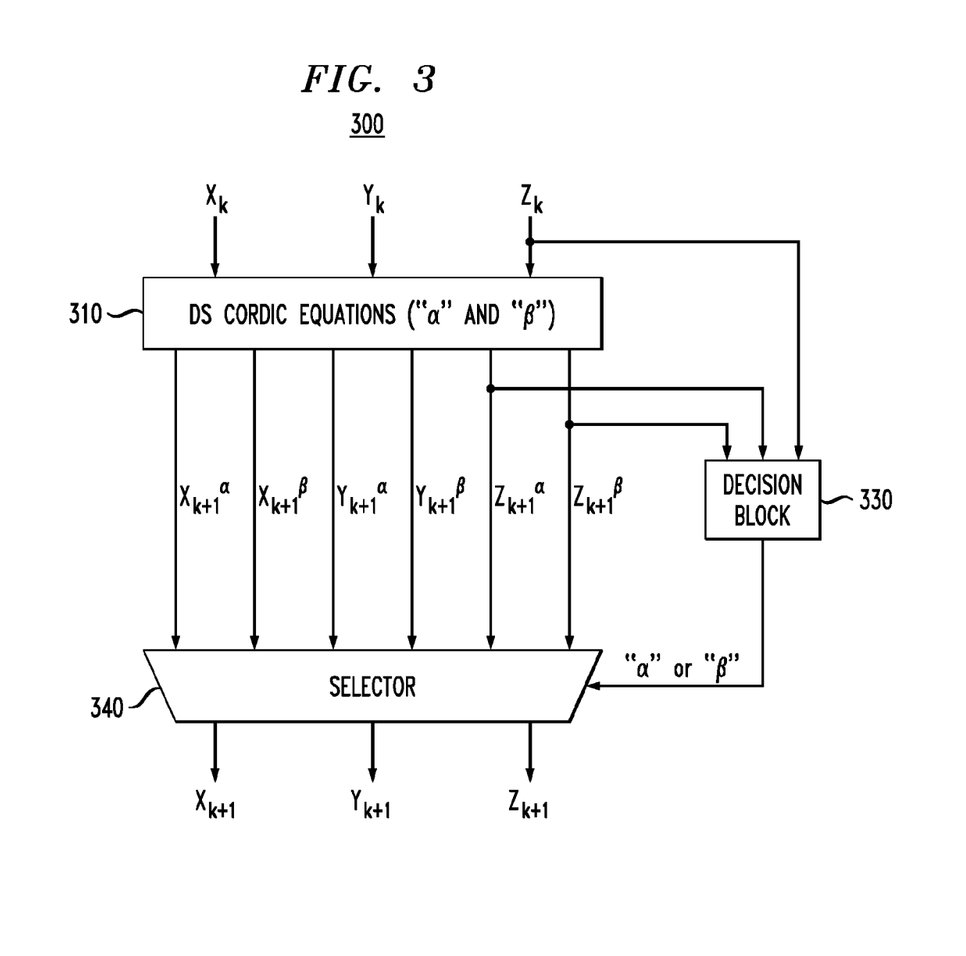
FIG. 3 shows a schematic block diagram of the $k^{th}$ pipeline stage of a conventional implementation of the double-step CORDIC algorithm.

FIG. 3 shows a schematic block diagram of the $k^{th}$ pipeline stage 300 of a conventional implementation of the double-step CORDIC algorithm. To achieve n bits of precision in the resulting cosine and sine values, n/2 double-step CORDIC iterations are required, where each iteration is implemented by a corresponding instance of stage 300 of FIG. 3. In one implementation, to achieve accuracy of 4 decimal places, a word length of 20 bits is chosen which requires 10 double-step CORDIC iterations. A 10-stage pipelined data path is implemented for this purpose, where each pipeline stage 300 performs one iteration.

As represented in FIG. 3, equation block 310 implements the pseudocode function CORDIC_Equations_C( ) for Equations (10) and (11) for the Z signal path as well as analogous functions for the X and Y signal paths. Decision block 330 implements the pseudocode function Decision_Block_C( ), and selector 340 implements the pseudocode function Selector_C( ).

The magnitude comparison in Decision_Block_C( ) after the $Z_{k+1}^{\alpha}$ and $Z_{k+1}^{\beta}$ signal generation of CORDIC_Equations_C( ) implies a full word-length addition/subtraction in decision block 330. As a result, direct implementation of the double-step CORDIC algorithm using stage 300 will not yield any better performance than two classical CORDIC iterations of stage 200 of FIG. 2 combined together into a single stage.

Double-Step CORDIC Algorithm and Implementation with Decision Postponing

As discussed previously, the magnitude comparison $(|Z_{k+1}^{\alpha}| < |Z_{k+1}^{\beta}|)$ in decision block 330 of FIG. 3 contributes significantly (i.e., one full word-length addition/subtraction) to the delay of each stage. In an implementation of the double-step CORDIC algorithm with decision postponing, the decision in each stage is postponed to the next stage. Since the decision of whether "α" or "β" is correct is not made in the current stage, the next stage implements the computations for both "α" and "β" inputs, one of which will be selected after the decision is made. The decision of the current stage is performed in parallel with the "α" and "β" computations of the next stage. As a result, computation is faster than in comparable conventional implementations of the double-step CORDIC algorithm shown in FIG. 3, albeit at the expense of area (i.e., the number of additions is doubled).

Figure 4:
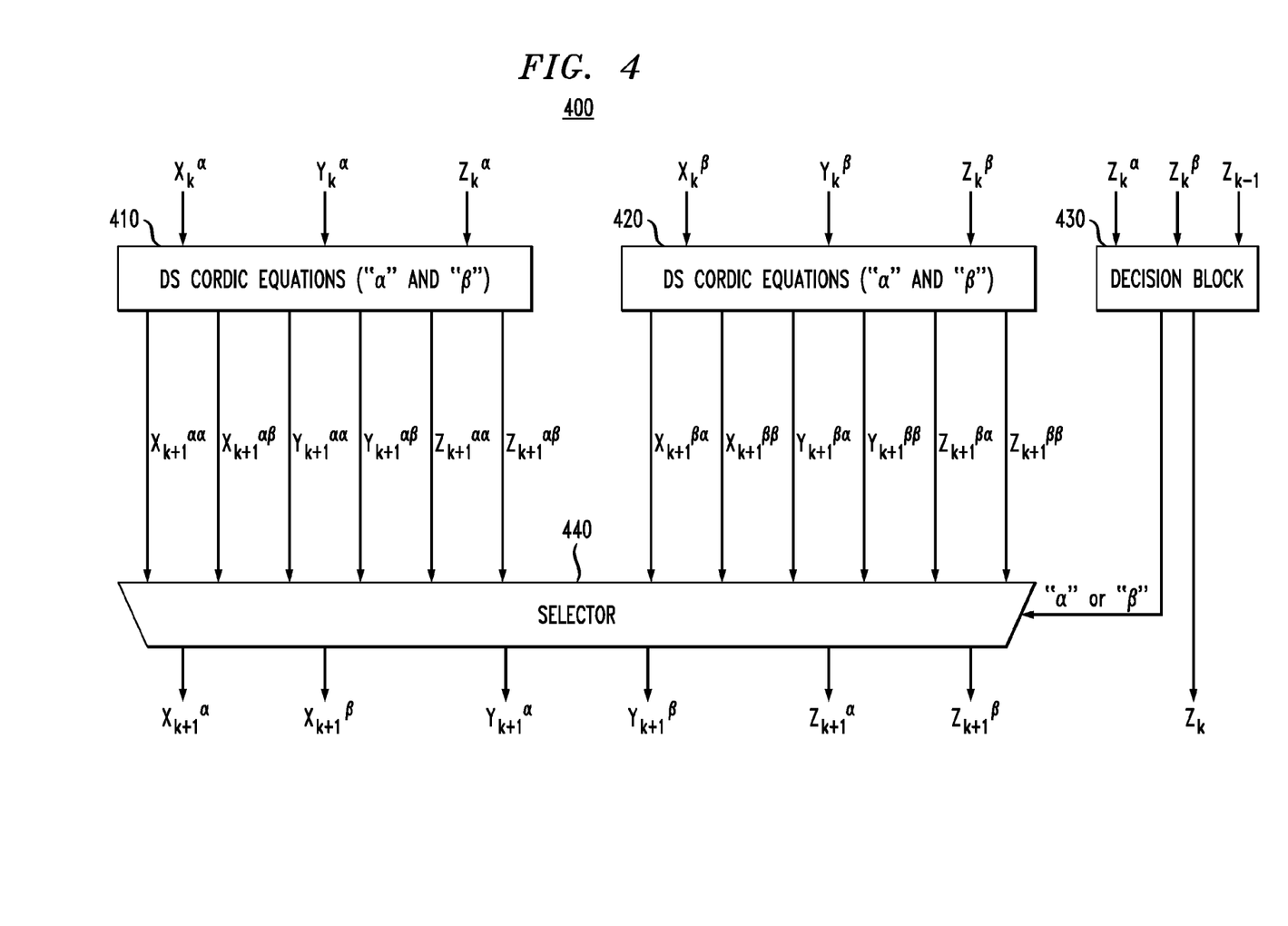
FIG. 4 shows a schematic block diagram of the $k^{th}$ pipeline stage of one possible implementation of the double-step CORDIC with decision postponing algorithm.

FIG. 4 shows a schematic block diagram of the $k^{th}$ pipeline stage 400 of one possible implementation of the double-step CORDIC with decision postponing algorithm. To achieve n bits of precision in the resulting cosine and sine values, (n/2+1) iterations of double-step CORDIC with decision postponing are required, where each iteration is implemented by a corresponding instance of stage 400 of FIG. 4. The extra iteration enables the decision of the $n/2^{th}$ iteration to complete. In one implementation, to achieve accuracy of 4 decimal places, a word length of 20 bits is chosen which requires 11 double-step CORDIC with decision postponing iterations. An 11-stage pipelined data path is implemented for this purpose, where each pipeline stage 400 performs one iteration.

The following pseudocode can be used to implement the Z signal path; analogous pseudocode would be implemented for the X and Y signal paths.

```
Double_Step_CORDIC_with_Decision_Postponing( ) {
    // Parallel Block 1
    CORDIC_Equations_DP( ) {
        d_k^α = sign(Z_k^α) ; d_k^β = sign(Z_k^β)
        Z_{k+1}^αα = Z_k^α − d_k^α arctan(2^−2k) − d_k^α arctan(2^−(2k+1))
        Z_{k+1}^αβ = Z_k^α − d_k^α arctan(2^−2k) + d_k^α arctan(2^−(2k+1))
```

-continued $$Z_{k+1}{}^{\beta\alpha} = Z_k{}^\beta - d_k{}^\beta \arctan(2^{-2k}) - d_k{}^\beta \arctan(2^{-(2k+1)})$$
$$Z_{k+1}{}^{\beta\beta} = Z_k{}^\beta - d_k{}^\beta \arctan(2^{-2k}) + d_k{}^\beta \arctan(2^{-(2k+1)})$$
}
// Parallel Block 2
Decision_Block_DP( ) {
    if ( sign($Z_k{}^\alpha$) == sign($Z_{k-1}$) ) "α" is correct
    else if ( sign($Z_k{}^\beta$) == −sign($Z_{k-1}$) ) "β" is correct
    else if ( mag($Z_k{}^\alpha$) < mag($Z_k{}^\beta$) ) "α" is correct
    else "β" is correct
}
Selector_DP( ) {
    if ("α" is correct) $Z_{k+1}{}^\alpha = Z_{k+1}{}^{\alpha\alpha}$ ; $Z_{k+1}{}^\beta = Z_{k+1}{}^{\alpha\beta}$
    if ("β" is correct) $Z_{k+1}{}^\alpha = Z_{k+1}{}^{\beta\alpha}$ ; $Z_{k+1}{}^\beta = Z_{k+1}{}^{\beta\beta}$
    }
}

In FIG. 4, equation block 410 implements the pseudocode function CORDIC_Equations_DP( ) for the α signal values from the previous stage for the Z signal path as well as analogous functions for the X and Y signal paths, while equation block 420 implements the same pseudocode function for the β signal values from the previous stage. Decision block 430 implements the pseudocode function Decision_Block_DP( ), while selector 440 implements the pseudocode function Selector_DP( ).

Note that equation blocks 410 and 420 and decision block 430 are executed in parallel. The instance of decision block 430 shown in FIG. 4 executes the decision for the previous (i.e., $(k-1)^{th}$) instance of stage 400.

Although stage 400 can be used to implement each of the (n/2+1) stages for an implementation of the double-step CORDIC with decision postponing algorithm, the first (i.e., k=0) stage and the last (i.e., k=n/2) stage do not require all of the components of stage 400.

Figure 5:
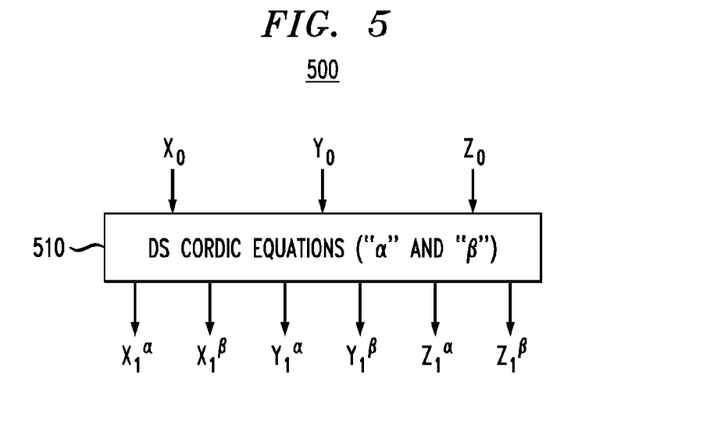
FIGS. 5 and 6 show schematic block diagrams of the first and last pipeline stages, respectively, of the implementation of double-step CORDIC with decision postponing algorithm.
Figure 6:
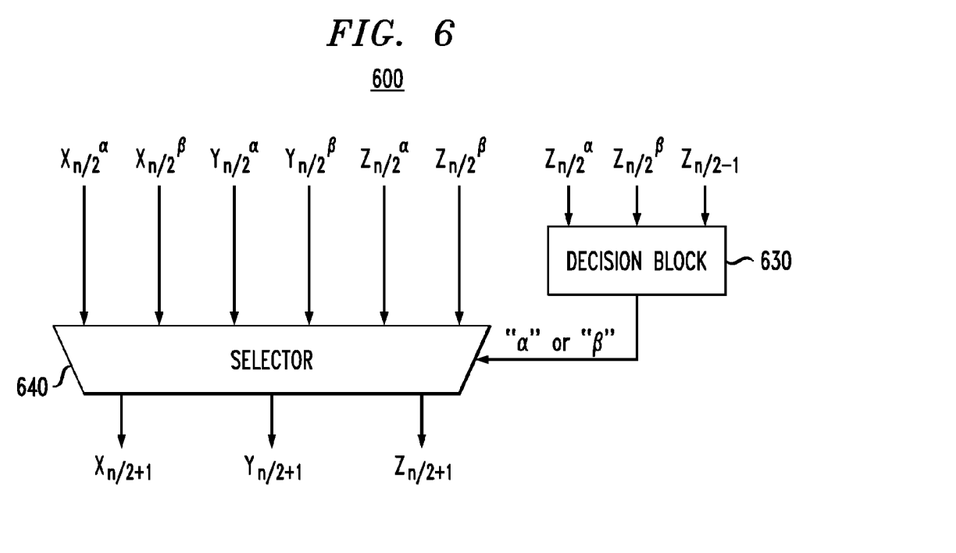

FIGS. 5 and 6 show schematic block diagrams of the first (i.e., k=0) pipeline stage 500 and the last (i.e., k=n/2) pipeline stage 600 of the implementation of double-step CORDIC with decision postponing algorithm, in which stage 400 of FIG. 4 is used to implement each intermediate (i.e., 0<k<n/2) stage. In particular, stage 500 comprises only a single equation block 510 (equivalent to either equation block 410 or 420 of FIG. 4), and stage 600 comprises only decision block 630 (equivalent to decision block 430 of FIG. 4) and selector 640 (analogous to selector 340 of FIG. 3).

In theory, the double-step CORDIC with decision postponing algorithm can be implemented in the context of any processor-based signal-processing application in which CORDIC-based computations can be performed. These signal-processing applications include, for example, a programmable tone generator used in a read channel for a hard disk drive.

Simulation Results

Table I presents experimental results for four different CORDIC implementations. The classical CORDIC implementation with one iteration per stage corresponds to FIG. 2, the conventional double-step CORDIC implementation corresponds to FIG. 3, and the double-step CORDIC with decision postponing corresponds to FIG. 4. The classical CORDIC implementation with two iterations per stage corresponds to an implementation in which two iterations of the classical CORDIC algorithm are combined into each stage. In Table I, the minimum clock period is the processing time for each stage, and the area is expressed in standard cell gate count.

TABLE I

Experimental Results of CORDIC Implementations

| Implementation | Word Length | Max Error in cos/sin | Min Clock Period | No. of Pipeline Stages | Area |
|---|---|---|---|---|---|
| Classical CORDIC (1 iteration/stage) | 20 | 0.000025 | 1.45 ns | 20 | 35056 |
| Classical CORDIC (2 iterations/stage) | 20 | 0.000025 | 2.4 ns | 10 | 34027 |
| Conventional Double-Step CORDIC | 20 | 0.000025 | 2.4 ns | 10 | 62958 |
| Double-Step CORDIC w/ Decision Postponing | 20 | 0.000025 | 1.9 ns | 11 | 106829 |

As can be seen from Table I, the conventional implementation of the double-step CORDIC algorithm does not yield any better performance than two classical CORDIC iterations combined together into a single stage. On the other hand, the double-step CORDIC with decision postponing algorithm significantly reduces the critical path delay for the chosen word length.

The present invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, general-purpose computer, or other processor.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, stored in a non-transitory machine-readable storage medium including being loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A double-step CORDIC processor comprising a plurality of iteration stages connected in series, at least one iteration stage adapted to generate a set of outgoing signals from a set of incoming signals, the at least one iteration stage comprising:
   one or more equation blocks adapted to implement CORDIC equation functions based on the set of incoming signals generated by a previous iteration stage to generate a first subset of intermediate signals and a second subset of intermediate signals;
   a selector adapted to select one of the first and second subsets of intermediate signals to be the set of outgoing signals based on a control signal; and
   a decision block adapted to generate the control signal for the selector, wherein:
      the decision block operates in parallel with the one or more equation blocks;
      the at least one iteration stage is an intermediate iteration stage; and
      the double-step CORDIC processor further comprises:
         a first iteration stage comprising a single equation block without a decision block and a selector; and
         a last iteration stage comprising a decision block and a selector without any equation block.

2. The invention of claim 1, wherein the decision block receives an incoming signal from the previous iteration stage and generates (i) the control signal for the selector and (ii) an outgoing signal for the next iteration stage.

3. The invention of claim 1, wherein the one or more equation blocks comprise:
   a first equation block adapted to generate the first subset of intermediate signals from a first subset of incoming signals; and
   a second equation block adapted to generate the second subset of intermediate signals from a second subset of incoming signals.

4. The invention of claim 1, wherein the decision block operated independent of any and all results from the one or more equation blocks.

5. A double-step CORDIC processor-implemented method comprising a plurality of iterations implemented in series, at least one iteration generating a set of outgoing signals from a set of incoming signals, the at least one iteration comprising:
   (a) the CORDIC processor implementing CORDIC equation functions based on the set of incoming signals generated by a previous iteration to generate a first subset of intermediate signals and a second subset of intermediate signals;
   (b) the CORDIC processor selecting one of the first and second subsets of intermediate signals to be the set of outgoing signals based on a control signal; and
   (c) the CORDIC processor generating the control signal for step (b), wherein:
      step (c) is implemented in parallel with step (a);
      the at least one iteration is an intermediate iteration; and
      the method further comprises:
         a first iteration that implements CORDIC equation functions without selecting a set of outgoing signals based on a control signal and without generating the control signal; and
         a last iteration that selects a set of outgoing signals based on a control signal and generates the control signal without implementing CORDIC equation functions.

6. The invention of claim 5, wherein step (c) comprises:
   (c1) the CORDIC processor receiving an incoming signal from the previous iteration; and
   (c2) the CORDIC processor generating (i) the control signal for step (b) and (ii) an outgoing signal for the next iteration.

7. The invention of claim 5, wherein step (a) comprises:
   (a1) the CORDIC processor generating the first subset of intermediate signals from a first subset of incoming signals; and
   (a2) the CORDIC processor generating the second subset of intermediate signals from a second subset of incoming signals.

8. The invention of claim 5, wherein step (c) is implemented independent of any and all results from step (a).

9. A non-transitory machine-readable storage medium, having encoded thereon program code, wherein, when the program code is executed by a machine, the machine implements a double-step CORDIC processor-implemented method comprising a plurality of iterations implemented in series, at least one iteration generating a set of outgoing signals, from a set of incoming signals, the at least one iteration comprising:
   (a) the CORDIC processor implementing CORDIC equation functions based on the set of incoming signals generated by a previous iteration to generate a first subset of intermediate signals and a second subset of intermediate signals;
(b) the CORDIC processor selecting one of the first and second subsets of intermediate signals to be the set of outgoing signals based on a control signal; and
(c) the CORDIC processor generating the control signal for step (b), wherein:
step (c) is implemented in parallel with step (a);
the at least one iteration is an intermediate iteration; and the method further comprises:
   a first iteration that implements CORDIC equation functions without selecting a set of outgoing signals based on a control signal and without generating the control signal; and
   a last iteration that selects a set of outgoing signals based on a control signal and generates the control signal without implementing CORDIC equation functions.

10. The invention of claim 9, wherein step (c) comprises:
(c1) the CORDIC processor receiving an incoming signal from the previous iteration; and
(c2) the CORDIC processor generating (i) the control signal for step (b) and (ii) an outgoing signal for the next iteration.

11. The invention of claim 9, wherein step (a) comprises:
(a1) the CORDIC processor generating the first subset of intermediate signals from a first subset of incoming signals; and
(a2) the CORDIC processor generating the second subset of intermediate signals from a second subset of incoming signals.

12. The invention of claim 9, wherein step (c) is implemented independent of any and all results from a step (a).

* * * * *